(12) United States Patent
Spurr et al.

(10) Patent No.: US 12,736,811 B2
(45) Date of Patent: Sep. 15, 2026

(54) EXTENDED EYE-BOX

(71) Applicant: Dualitas Ltd, Milton Keynes (GB)

(72) Inventors: Michael Spurr, Milton Keynes (GB); Daniel Molina, Milton Keynes (GB); Gary Mills, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 277 days.

(21) Appl. No.: 18/500,783

(22) Filed: Nov. 2, 2023

(65) Prior Publication Data

US 2024/0151969 A1 May 9, 2024

(30) Foreign Application Priority Data

Nov. 9, 2022 (GB) ..................................... 2216715

(51) Int. Cl.
*G02B 27/01* (2006.01)

(52) U.S. Cl.
CPC ..... *G02B 27/0149* (2013.01); *G02B 27/0103* (2013.01); *G02B 27/0179* (2013.01);
(Continued)

(58) Field of Classification Search
CPC ............ G02B 27/0149; G02B 27/0103; G02B 27/0179; G02B 2027/0159;
(Continued)

(56) References Cited

U.S. PATENT DOCUMENTS 8,159,733 B2 4/2012 Christmas et al.
9,514,517 B2 12/2016 Christmas
(Continued)

FOREIGN PATENT DOCUMENTS

CN 104166238 A * 11/2014 ......... G02B 27/0149
DE 102017212454 A1 1/2019
(Continued)

OTHER PUBLICATIONS

UKIPO Combined Search and Examination Report under Sections 17 and 18(3), Application No. GB 2216715.9, mailed May 11, 2023, 6 pages.

*Primary Examiner* — Arnel C Lavarias
(74) *Attorney, Agent, or Firm* — McDonnell Boehnen Hulbert & Berghoff LLP

(57) ABSTRACT

A head-up display system includes an eye-box having a first and second dimension, an image projector including a picture generating unit and an optical system, and a movement assembly. The picture generating unit includes a spatial light modulator arranged to spatially modulate light in accordance with a hologram. The optical system relays the spatially modulated light to an optical combiner. The movement assembly moves at least a portion of the image projector rectilinearly between a plurality of positions such that at least one component of the picture generating unit is moved together with the optical system. Spatially modulated light relayed to the optical combiner forms a virtual image viewable from a sub-eye-box having a position in the first dimension being dependent on the position of the at least a portion of the image projector. The eye-box is the sum of the sub-eye-boxes associated with each of the plurality of positions.

21 Claims, 9 Drawing Sheets

(52) U.S. Cl.
CPC ................ *G02B 2027/0159* (2013.01); *G02B 2027/0187* (2013.01)

(58) Field of Classification Search
CPC .............. G02B 2027/0187; G02B 5/32; G02B 27/01; G02B 27/0101; G02B 2027/0107; G02B 2027/0123; G02B 2027/015; G02B 2027/0154; G02B 2027/0161; G02B 2027/0181; G03H 1/00; G03H 1/08; G03H 1/0866; G03H 2001/0883; G03H 1/0891; G03H 1/2202; G03H 2001/2223; G03H 2001/2236; G03H 2001/2239; G03H 2001/2242
USPC ...... 359/13, 1, 9, 14, 15, 19, 22, 29, 32, 35; 430/1, 2
See application file for complete search history.

(56) References Cited

U.S. PATENT DOCUMENTS

| | | | |
|---|---|---|---|
| 9,857,771 | B2 | 1/2018 | Christmas |
| 2019/0187482 | A1 | 6/2019 | Lanman |
| 2021/0216041 | A1 | 7/2021 | Christmas |
| 2021/0221224 | A1 | 7/2021 | Christmas |
| 2021/0382304 | A1 | 12/2021 | You et al. |

FOREIGN PATENT DOCUMENTS

| | | | | |
|---|---|---|---|---|
| DE | 102017222621 | A1 | 6/2019 | |
| WO | 2016/105282 | A1 | 6/2016 | |
| WO | 2017186806 | A1 | 11/2017 | |
| WO | 2019238846 | A1 | 12/2019 | |
| WO | WO-2020167263 | A1 * | 8/2020 | ......... G02B 27/0101 |

* cited by examiner

EXTENDED EYE-BOX

CROSS-REFERENCE TO RELATED APPLICATIONS

This application claims the benefit of priority of United Kingdom Patent Application No. 2216715.9 filed Nov. 9, 2022, which is hereby incorporated herein by reference in its entirety.

FIELD

The present disclosure relates to an image projector and a method of image projection. More specifically, the present disclosure relates to a head-up display system comprising the image projector. Some embodiments relate to a head-up display for forming virtual images visible from an eye-box defined by a plurality of sub-eye-boxes. Some embodiments relate to a head-up display for a vehicle comprising a windscreen.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

There is disclosed herein an improved HUD for an automotive vehicle. The HUD includes a picture generating unit. The picture generating unit may be arranged to generate a picture including information content, such as speed or navigation information. There is also provided an optical relay or projection system arranged to form a virtual image of the information content. The virtual image of the information content may be formed at a suitable viewing position for the driver such as within the driver's normal field of view whilst operating the automotive vehicle. For example, the virtual image of the information content may appear at a distance down the bonnet (or hood) of the vehicle from the driver. The virtual image of the information content is positioned so as not to adversely affect the driver's normal view of the scene. The virtual image of the information content may be overlaid on the driver's view of the real world. The information content is computer-generated and may be controlled or updated in real-time to provide real-time information to the driver.

Embodiments relate to a picture generating unit comprises a holographic projector by way of example only. In embodiments relating to a holographic projector, the picture may be a holographic reconstruction of a computer-generated hologram. The picture may be formed on or projected onto a light receiving surface which acts as a display surface. A HUD based on the holographic projector described in full below is able to deliver a much greater contrast ratio than currently available competing technologies because of the efficiency of the holographic process and its inherent suitability for use with a laser light source.

The head-up display may comprise a holographic processor. The picture may be a holographic reconstruction. The holographic processor may be arranged to output the computer-generated hologram to a spatial light modulator. The computer-generated hologram may be arranged to at least partially compensate for the shape of the windscreen of the vehicle.

The system may be arranged to form the virtual image of the picture using the windscreen by (partially) reflecting spatially-modulated light off the windscreen. The light source may be a laser and/or the light of the picture may be laser light. The spatial light modulator may be a liquid crystal on silicon spatial light modulator. The picture may be formed by an interference process of the spatially-modulated light at the light receiving surface. Each computer-generated hologram may be a mathematical transformation of a picture, optionally, a Fourier or Fresnel transformation. The computer-generated hologram may be a Fourier or Fresnel hologram. The computer-generated hologram may be a hologram computer-generated by a point cloud method. The spatial light modulator may be arranged to spatially-modulate the phase of the light from the light source. The spatial light modulator may be arranged to spatially-modulate the amplitude of the light from the light source.

There is provided a head-up display for a vehicle having a window. The head-up display comprises a picture generating unit and an optical relay system (projection engine). The picture generating unit is arranged to output pictures. The projection engine (or optical system) is arranged to receive the pictures output by the picture generating unit and project the pictures onto the window of the vehicle in order to form a virtual image of each picture within a (common) virtual image area.

The virtual image formed by reflecting spatially modulated light off the windscreen of the vehicle is viewable from an eye-box. As the skilled person will appreciate, in an imaging system, the viewing area (user's eye-box) is the area in which a viewer's eyes can perceive the image. It is generally desirable for a HUD system in a vehicle to provide an eye-box that is large enough to enable some movement of the eye/s to occur, whilst still enabling the user to see the image. However, increasing the size of the eye-box may also result in a corresponding increase in the size of/volume occupied by the HUD system. This is because the optical relay system (projection engine) may comprise at least one large optical component such as a large mirror to relay light from the picture generating unit to the windscreen of the vehicle and a large optical throw to achieve the necessary magnification required for a relatively large eye-box. This is a problem because HUD systems are conventionally housed within the dashboard of the vehicle. Real-estate within the cabin space—particularly within the dashboard volume—is highly valuable in modern vehicles containing many complex electronic systems and head-up displays are quite expensive in terms of real-estate. The limited space for the optical components of the HUD places a limit on the maximum size of the eye-box.

Another problem with increasing the size of optical components (such as the large mirror) to increase the size of the eye-box is that, as with any optical component, the performance of the optical component declines with distance from the optical axis. In particular, aberrations increase with distance from the optical axis. The outer most parts of the at least one optical element of the projection engine therefore have the most detrimental effect on image quality. The overall image quality is therefore reduced if the eye-box is increased by increasing the size of at least one optical element of the projection engine.

It would be desirable to provide a HUD system with a large eye-box from which high quality images are visible to a user of the HUD system while occupying less space/volume.

According to a first aspect of the present disclosure there is provided a head-up display system (HUD system). The head-up display system has particular application as a HUD for use in a vehicle comprising an optical combiner, and may be located in the dashboard of the vehicle. The HUD system comprises an eye-box. The eye-box has or extends in a first dimension. The first dimension may be a height of the eye-box. The eye-box has or extends in a second dimension. The second dimension may be a width of the eye-box. The first dimension may be orthogonal to the second dimension.

The HUD system further comprises a picture generating unit and an optical system. The picture generating unit comprises a spatial light modulator. The spatial light modulator is arranged to display a hologram or picture content such that light incident on the spatial light modulator is spatially modulated in accordance with the hologram or picture content. The optical system is arranged to relay spatially modulated light from the picture generating unit. In some embodiments, the optical system is arranged to relay the spatially modulated light to an optical combiner. In some embodiments, the optical system is arranged to relay the spatially modulated light to an eye-box of the head-up display system. This may or may not be via the optical combiner. For example, when the optical system is arranged to relay the spatially modulated light to the eye-box via the optical combiner, the head-up display system may be arranged such that the spatially modulated light is at least partially reflected by the optical combiner to then be relayed to the eye-box. The optical combiner may be an external optical combiner. In other words, the optical combiner may not be a feature of the HUD system per se. Instead, the optical combiner may be an optical combiner of a vehicle such as a windscreen.

The HUD system further comprises a movement assembly arranged to move at least a portion of the image projector between a plurality of (discrete) positions. In some embodiments, the movement assembly is arranged to move the image projector as a whole between the plurality of (discrete) positions. In such cases, the movement assembly being arranged to move the image projector (as a whole) herein means that each component of the image projector is moved together by the movement assembly and each component of the image projector may be moved in the same direction and by the same amount between each of the plurality of positions. The components herein means (at least) the picture generating unit and the optical system. In other words, a separation between the picture generating unit and the optical system may be constant in each position of the image projector.

In some embodiments, the movement assembly is arranged to move a portion of the image projector between the plurality of (discrete) positions. So, the movement assembly may be arranged to move less than the whole image projector. In some embodiments, the movement assembly may be arranged to move at least one component of the picture generating unit together with the optical system when the portion of the image projector is moved between the plurality of positions. In such cases, each component of the respective portion of the image projector is moved together by the movement assembly and each component of the respective portion of the image projector may be moved in the same direction and by the same amount between each of the plurality of positions. Thus, a separation between the respective (moved) component of the picture generating unit and the optical system may be constant in each of the plurality of positions. However, a separation between moved and unmoved components of the image projector may change in each of the plurality of positions. In some embodiments, the image projector may comprise a housing. The housing of the image projector may not be moved by the movement assembly. Thus, the movement assembly may be arranged to move the at least one component of the image projector and the optical system together with respect to the housing.

Herein, references are made to the position of the image projector (as driven by/moved by the movement assembly). Unless otherwise stated, this wording also encompasses the position of a portion of the image projector, as determined by the movement assembly. So, a reference to the image projector being in a first position of the plurality of positions (of the image projector) would also encompass the respective portion of the projector being in a first position of the plurality of positions (of the respective portion).

The head-up display is arranged such that the spatially modulated light relayed towards the eye-box of the image projector (optionally, via an optical combiner) forms a virtual image viewable from a sub-eye box. The extent of the sub-eye-box in the first dimension is less than extent of the eye-box in the first dimension. The head-up display may be arranged such that the spatially modulated light relayed towards the eye-box of the image projector (optionally, via an optical combiner) forms a virtual image viewable from a sub-eye-box in each position of the image projector. In other words, there may be a sub-eye-box associated with each of the plurality of positions of the image projector. The position of the sub-eye-box (in the first dimension) is dependent on the position of the at least portion of the image projector. In more detail, the (at least portion of the) image projector may have at least a first position and a second position. The (at least portion of the) image projector may be moveable between the first position and the second position by the movement assembly. In the first position of the (at least portion of the) image projector, a virtual image may be viewable from a first sub-eye-box. In the second position of the (at least portion of the) image projector, a virtual image may be viewable from a second sub-eye-box. The first sub-eye-box may have a different position in the first dimension than the second sub-eye-box. In other words, the first sub-eye-box may be defined in a different spatial position to the first sub-eye-box, the difference in spatial position being along the first dimension.

The eye-box may be the sum of the sub-eye-boxes associated with each of the plurality of positions of the (at least portion of the) image projector. For example, the eye-box may be the sum of at least the first sub-eye-box and the second sub-eye-box described above. The eye-box formed as the sum of the sub-eye-boxes may be referred to herein as an "effective" or "extended" eye-box. The movement assembly may be arranged such that the sum of the sub-eye-boxes defines a continuous (effective or extended) eye-box, for example adjacent sub-eye-boxes the form the (effective or extended) eye-box may not be spatially separated from one another or may overlap one another.

By forming an (effective) eye-box as a sum of sub-eye-boxes having different positions in the first dimension, the (effective) eye-box has a size that is extended in the first dimension relative to the size of the sub-eye-box. A virtual image may not be visible at all points within the (effective) eye-box simultaneously at any one time. Instead, the image projector may be moved by the movement assembly to an appropriate position of the plurality of positions such that the virtual image is visible from an (instantaneous) sub-eye-box within a desired portion of the (effective) eye-box, as required. Generally, the HUD system may be arranged to move the image projector such that the virtual image is visible from a sub-eye-box containing a viewing system such as a user's eye. The HUD system may be further arranged to move the image projector to other positions of the plurality of positions in response to a detected or inferred change in the position of the viewing system so that the virtual image remains visible despite the viewing system's change in position. In this way, the virtual image may remain visible to a viewing system positioned at any point within the effective eye-box.

The significant advantage of the HUD system according to the disclosure is that the physical size of the head-up display is reduced while maintaining a relatively large eye-box. This is because the optical components of the HUD system need only be suitably sized to form the (relatively smaller) sub-eye-box, and a plurality of sub-eye-boxes are formed by translating the image projector. Thus, the size/volume of the HUD system is reduced compared to that needed to form the full (extended) eye-box using a fixed image projector. In particular, the optical system (projection engine) of the HUD system may comprise an optical component such as a mirror arranged to relay the spatially modulated light of the picture generating unit to the optical combiner. The mirror may be a freeform mirror. The mirror may at least partially extend in the first dimension. For example, while the mirror may not lie in a plane in the first dimension, an area or volume occupied by the mirror may be broken down into a first component extending in the first dimension and a second component extending in the second dimension. The greater the extent of the mirror in the first dimension, the greater the size of the sub-eye-box in the first dimension. So, by forming a sub-eye-box having a reduced size in the first dimension, a smaller mirror may also be provided such that the overall volume of the HUD system (comprising the mirror) may be reduced.

The first dimension may correspond to the height of the (effective) eye-box and/or sub-eye-box. So, it may be that the height of the HUD system in the first dimension is also reduced (because of a corresponding reduction in the height of the mirror in the first dimension). Reducing the height of the sub-eye-box may be more effective in reducing the overall volume of the HUD system than reducing the sub-eye-box in the second dimension. This is because the HUD system may typically extend predominantly in a plane substantially parallel with the second dimension. So, the size of the HUD system may mostly be determined by the size and position of components of the HUD system that are not dependent on the size of the eye-box (e.g. not the mirror). An increase or decrease in size of the mirror in the second dimension may thus cause a minimal overall change in the volume of the HUD system. However, the mirror may typically be the component of the HUD system that extends most prominently in the first dimension. Thus, increases in the size of the mirror in the first dimension have a relatively large effect on the overall volume occupied by the HUD system.

Another advantage of the HUD system of the present disclosure is that the virtual image visible from each sub-eye-box experiences less (optical) aberration because the optical components of the HUD system can be made smaller (at least in the first dimension). Thus, the overall quality of virtual images visible from the sub-eye-box is improved.

As above, the present disclosure describes moving at least a portion of an image projector (comprising both a picture generating unit and an optical system) in order provide a sub-eye-box in a variety of different positions. In particular, the present disclosure describes moving at least a component of the picture generating unit together with the optical system in order to provide a sub-eye-box in a variety of different positions. There is a significant prejudice in the technical field against moving an image projector in this way.

In conventional HUD systems (comprising conventional displays such as LCD or TFT screens) for vehicles, simply moving the conventional display and associated optical system together in order to shift the eye-box would adversely affect the quality of the image and look-down angle of the virtual image viewable from the eye-box. This is a particular problem when the optical combiner has a (complex) curved shape (such as a windscreen). In different positions of the display and optical system, the spatially modulated light may be relayed to different portions of the optical combiner to form a virtual image. If the optical combiner has a (complex) curved shape, such as a windscreen of a vehicle, the shape of the portion of the optical combiner on which the light is relayed will be different for each position of the image projector. This can result in distortion of the virtual image and a change in look-down angle.

To compensate for this distortion and change in look-down angle, a much more complicated movement mechanism is required. For example, a mirror that relays light from a conventional display device may be rotated and tilted with respect to the display device and the optical combiner. If the mechanism has a suitable number of degrees of freedom and range of motion, the mirror may be rotated and titled in such a way that the look-down angle of the viewer to the image is unchanged in the different spatial positions of the eye-box and such that the image received by a viewing system (such as a user's eye) is not distorted by the windscreen. Including such a complicated movement mechanism has many disadvantages. One disadvantage is that the mechanism for rotating and tilting the mirror is very complicated (e.g. comprises many moving parts). Another disadvantage is that the mechanism is bulky which further increases the overall volume of the HUD system. Furthermore, the mechanism must be adjacent the mirror. The mirror in such systems is typically positioned in the heart of the dashboard where real-estate is most valuable. So, not only does the mechanism increase the overall volume of the HUD system but it does so in the least convenient part of the HUD system.

Thus, when tasked with providing a compact and simple HUD-system which is capable of projecting large, high-quality images, there is significant prejudice against providing moving optical components within the HUD. The movement assembly typically needed to move such optical components is complicated and bulky.

However, despite this prejudice, the inventors have devised a simple 1D translating assembly that does not comprise a complicated mechanism for e.g. rotating and titling a relay mirror and, instead, utilises dynamic holography to address the problems described above. In particular, the method comprises forming a holographic reconstruction of a HUD image on a screen that is spatially separated from a pixel array that displays a hologram of the HUD image. This provides significant flexibility on the image size and shape that can address the problems with a conventional image system without compromising on optical efficiency because the holographic process forms the HUD image by light redirection rather than simply switching on/off image pixels. The HUD system of the present disclosure is arranged to display a (computer-generated) hologram of an image on the spatial light modulator such that light incident on the spatial light modulator is encoded with the hologram. The hologram displayed on the spatial light modulator can be determined in such a way as to account for the shape of the optical combiner (which may have a complex curved shape) and to account for the changing geometry of the image projector with respect to the optical combiner in each position. The hologram may be dynamically reconfigured. The HUD system may be arranged such that the hologram displayed on the spatial light modulator compensates for these differences, to remove distortion from the virtual image and to ensure a constant look-down angle is maintained without the need for complicated hardware to manipulate a mirror of the optical (relay) system. In one example, these benefits are achieved by processing (e.g. distorting) the HUD image before hologram calculation based on a translation position of the translating assembly.

In the HUD system of the present disclosure, the movement assembly may be arranged to apply a simple motion (such as linear/rectilinear) to the (at least portion of the) image projector between positions. Thus, the movement assembly can be made simple and compact, resulting in a HUD system having a smaller overall volume. In the context of a HUD system for a vehicle, the bulk of the movement assembly may be arranged to be present in a portion of the HUD system which fills a part of the dashboard where real-estate is less expensive. Furthermore, a common movement means may be used for both the (at least one component of the) picture generating unit and the optical system together. Moving both the (at least one component of the) picture generating unit and the optical system together as a single portion/image projector may advantageously ensure that a separation between the two is constant in each position (i.e. the separation between the at least one component of the picture generating unit and the optical system may be constant in each position). Thus, the optical path from the at least one component of the picture generating unit (optionally, from the spatial light modulator), through the optical system, is the same in each position of the image projector. A projection distance may be defined between the image projector and the optical combiner. The projection distance may be a distance travelled by light relayed from the image projector to the optical combiner. The projection distance may be different in each of the plurality of positions of the image projector.

As above, the movement assembly may be arranged to move the image projector as a whole. The inventors expected this to be the preferred arrangement, because moving the image projector as a whole (i.e. as a single unit) is simple. Furthermore, moving components of the image projector with respect to one another may result in a change in the path length/separation between components and so was expected to increase the complexity of the system (for example, to maintain optical alignment of individual components of the image projector and to ensure that the projection remains in focus). However, after thorough simulation and experimentation, the inventors have found that there are advantages to moving only a portion of the image projector (as described above). The main advantage is that the inventors have found that such an arrangement occupies less space. In particular, the inventors have found that it is much more space efficient if only a portion of the image projector is moved (rather than the image projector as a whole) as there is no need to allow space for the entire image projector in each of its positions. The inventors have also recognised that the other disadvantages of moving only a portion of the image projector, described above, can be compensated for in what is displayed on the spatial light modulator. For example, the inventors have recognised that a change in the relative separation between components of the picture generating unit/image projector can be compensated for by displaying a diffractive pattern having an appropriate optical power on the spatial light modulator to compensate for the change in separation. The diffractive pattern may be a lens (e.g. a software lens). The diffractive pattern may be displayed simultaneously with the hologram.

The movement assembly may be arranged to move the image projector rectilinearly (or linearly) between the plurality of positions. As described above, such a movement assembly may advantageously be simple and compact. Furthermore, the inventor has appreciated that rectilinear motion of the image projector is only possible because the picture generating unit comprises a spatial light modulator rather than a conventional display. As described above, the hologram/picture content displayed on spatial light modulator can be generated in a which compensates for any changes in the shape of the portion of the optical combiner to which the spatially modulated light is relayed.

The head-up display may further comprise a hologram engine. The hologram engine may be arranged to generate a computer-generated hologram of an image. The hologram engine may be arranged to generate the computer-generated hologram dependent on the position of the image projector. For example, the hologram engine may be arranged such that position and/or the size of the holographic reconstruction (i.e. image) formed or displayed on the light-receiving surface (e.g. screen or diffuser) is dependent on the (translational) position of the image projector. This may be achieved by processing the image before determination or calculation of the hologram for display.

The inventors have found that the number and size of the sub-eye-boxes can be optimized. As described above, it is advantageous for the extent of the sub-eye-boxes in the first dimension to be small because the volume of the HUD system can then be minimised. However, the smaller the size of the sub-eye-boxes, the greater the number of (small) sub-eye-boxes required to provide a large (effective) eye-box. A viewing system (such as an eye) moving about in such an (effective) eye-box (comprising small sub-eye-boxes), may cause the movement assembly to need to very frequently move the image projector to different positions. This may have the effect of providing a jarring viewing experience. Increasing the extent of the sub-eye-boxes in the first dimension provides a smoother viewing experience but at the expense of increasing the overall volume of the HUD system (although volume of the HUD system may still be smaller than if the optics were configured to provide the full size eye-box). After simulation and experimentation, the inventors have found that the following numbers and sizes of sub-eye box and eye-box provide a smooth viewing experience while minimising the HUD system volume. The movement assembly may be arranged such that there are four or more positions of the image projector, optionally six or more positions of the image projector. The movement assembly may be arranged such that there are twelve or fewer, optionally eight or fewer positions of the image projector. There may be a sub-eye-box associated with each position of the image projector such that there may be four or more, optionally six or more, sub-eye-box positions and/or twelve or fewer, optionally eight or fewer sub-eye-box positions. The extent of the (effective) eye-box in the first dimension (height) may be 100 millimetres or more, optionally 125 millimetres or more, optionally 150 millimetres or more. The extent of each sub-eye-box in the first dimension (height) may be substantially the same at each position. The extent of each sub-eye-box in the first dimension (height) may be 75 millimetres or less, optionally 50 millimetres or less at each unique position. The extent of each sub-eye-box in the first dimension (height) may be 10 millimetres or more, optionally 20 millimetres or more.

The movement assembly may comprise a stepper motor. The stepper motor may be directly or indirectly coupled to the image projector. The stepper motor may be arranged to move the image projector. A stepper motor is advantageously straightforward to control. The full rotation of a stepper motor may be divided into a discrete number of steps and the stepper motor may be controllable to move a specific number of steps and hold at a particular step. Thus, a movement assembly comprising a stepper motor may simply be controlled to move the image projector between the plurality of positions based on a predetermined number of steps of the stepper motor. It may therefore be straightforward for a controller to instruct the stepper motor to rotate a specific number of steps in order to move between any two positions of the plurality of positions of the image projector. The number of steps of the stepper motor may be the same or different between adjacent positions of the image projector.

The movement assembly may comprise a means to convert a rotational motion of the stepper motor into linear or rectilinear motion of the image projector. In some embodiments, the movement assembly comprises a linear actuator comprising the stepper motor. The linear actuator may further comprise a screw arranged to convert the rotational motion of the stepper motor into linear motion of the screw. The screw may be coupled to the image projector such that linear motion of the screw also causes linear motion of the image projector. In some embodiments, the movement assembly may comprise a rack and pinion. The pinion may be driven by the stepper motor. The rack may be coupled to the image projector and arranged such that rotation of the pinion causes linear motion of the rack (and image projector coupled to the rack).

The HUD system may further comprise a frame. The picture generating unit may be coupled to the frame. The optical system may be coupled to the frame. The frame may be rigid. The frame may maintain the picture generating unit at a fixed distance with respect to the optical system. The movement assembly may be arranged to move the frame. For example, the stepper motor may be coupled to the frame for example via the screw or rack described above.

The HUD system may further comprise a controller. The controller may be configured to control the movement assembly to move the (at least portion of the) image projector to one of the plurality of positions. The controller may be configured to control the movement assembly to move the (at least portion of the) image projector between a first position and a second position of the plurality of positions. When the movement assembly comprises a stepper motor, the controller may be configured to control the stepper motor. The controller may be configured to control the movement assembly based on an input related to the position of a viewing system.

In some embodiments, the HUD system may comprise an eye-tracker. The eye-tracker may be arranged to monitor/detect the position of the viewing system. The viewing system may be an eye of a user. The input may be an output from the eye-tracker. The controller may be configured to control the movement assembly to move the (at least portion of the) image projector to a position in which the sub-eye-box aligns with the detected position of the viewing system. In other words, the viewing system may fall within the sub-eye-box. In this way, the head-up display may be said to track the viewing system and move the image projector accordingly.

In some embodiments, the HUD system may be for a vehicle and the input may relate to a specific set up of the vehicle. For example, the input may relate to positional and/or height information of a (driver's) seat of the vehicle received at the controller. Based on this information, the controller may advantageously infer the position of a driver's eye(s) and may control the movement assembly to move the image projector accordingly. This is because the driver's eye position may be dependent on the seat position/height. Thus, when a driver adjusts the height/position of the seat (such that their eye's move accordingly), the sub-eye-box may be repositioned such the sub-eye-box still coincides with at least one of the driver's eyes.

The picture generating unit may further comprise a light source. The picture generating unit may further comprise a light receiving member. The light receiving member may be a screen or diffuser. The light receiving member (such as a screen or diffuser) may be arranged to receive the spatially modulated light such that a holographic reconstruction may be formed on the light receiving member. The light receiving member may be spatially separated from the display device.

In some embodiments, the picture generating unit comprises a light receiving surface. The light receiving surface is arranged such that a holographic reconstruction is formed or displayed on the light receiving surface. The holographic reconstruction may be a reconstruction of a picture or image encoded in the hologram.

In some embodiments, the at least one component of the picture generating unit that is moved by the movement assembly comprises or consists of the light receiving surface. In some embodiments, the spatial light modulator of the picture generating unit is permanently fixed with respect to the optical system. In other words, the movement assembly is arranged to not move the spatial light modulator. Thus, the movement assembly may be arranged to move the light receiving surface relative to the spatial light modulator when the portion of the image projector is moved between the plurality of positions. In other words, a separation between the spatial light modulator and the light receiving surface may change as the portion of the image projector is moved by the movement assembly between the plurality of positions.

In some embodiments, the HUD system further comprises a controller arranged to drive the spatial light modulator to display a diffractive pattern. The diffractive pattern may have an optical power. For example, the diffractive pattern may perform as a lens. Herein, the diffractive pattern may be referred to as software lens. The diffractive pattern may be arranged such that the holographic reconstruction is formed at a replay plane that is substantially coincident with the light receiving surface. For example, the optical power of the diffractive pattern may be such that the holographic reconstruction is formed at said replay plane. As described above, a change in the separation between optical components of the image projector could cause optical issues (for example, because the path length between optical components has changed). For example, it may be important that the replay plane is substantially coincident with the light receiving surface such that the holographic reconstruction formed on the light receiving surface is in focus. Changing a separation between the spatial light modulator and the light receiving surface (because of movement of the light receiving surface and not the spatial light modulator by the movement assembly) might mean that the holographic reconstruction becomes out of focus. However, the inventors have recognised that the use of the software lens can compensate for the change in separation. In some embodiments, the controller is arranged to change the diffractive pattern depending on a separation between spatial light modulator and the light receiving surface. The controller may be arranged to select a diffractive pattern having an optical power arranged such that the replay plane is substantially coincident with the light receiving surface in a given position/for a given separation between the spatial light modulator and the light receiving surface. Thus, the holographic reconstruction may be in focus in each of the plurality of positions of the portion of the image projector.

In a second aspect there is provided a display system. The display system comprises a head-up display system. The head-up display system may be a HUD system according to the first aspect. The display system may further comprise an optical combiner. The optical combiner may have a curved shape. The optical combiner may have a complex curved shape.

While the optical combiner may have a (complex) curved shape, the optical combiner may be substantially planar in that the optical combiner may extend much further in a first and second dimension than in a third dimension. The third dimension of the optical combiner may correspond to a thickness of the optical combiner. The first dimension of the optical combiner may correspond to a height of the optical combiner and the second dimension of the optical combiner may correspond to a width of the optical combiner. The thickness may be less than 10%, optionally less than 5%, optionally less than 1% of the width of height of the optical combiner. The first and second dimension of the optical combiner may not be parallel to the first and second dimensions of the eye-box described above. The optical combiner may substantially lie in a first plane. A second plane defined by the eye-box may have an acute angle with respect to the first plane.

The movement assembly may be arranged to move the image projector linearly (rectilinearly) in a first direction that is angled relative to the first plane (such that the first direction does not lie in the first plane). The first direction may be parallel to spatially light modulated light emitted by the picture generating unit. The first direction may be perpendicular to the first dimension of the first eye-box. The plurality of discrete positions of the image projector may comprise a first position and a second position. A distance travelled by light relayed from the picture generating unit to the optical combiner may be smallest when the image projector is in the first position and largest when the image projector is in the second position. A bottom portion of the extended eye-box may be defined by the instantaneous eye-box when the image projector is in the first position and a top portion of the extended eye-box is defined by the instantaneous eye-box when the image projector is in the second position.

The display system may be for a vehicle. The HUD-system may be for a vehicle. The optical combiner may be a windscreen of the vehicle.

In a third aspect there is a provided a method of forming a virtual image viewable from an eye-box having a first dimension and a second dimension. The method comprises moving at least a portion of an image projector. The image projector comprises a picture generating unit and an optical system. Moving the at least portion of image projector comprises moving the at least portion of image projector to a first position of a plurality of positions of the image projector such that at least one component of the picture generating unit is moved together with the optical system. The picture generating unit comprises a spatial light modulator arranged to display a hologram such that light incident on the spatial light modulator is spatially modulated in accordance with the hologram. The optical system is arranged to relay spatially modulated light from the picture generating unit to an optical combiner. The method further comprises forming a virtual image viewable from a first sub-eye-box in a first position in the first dimension. The image projector is arranged such that a virtual image is viewable from a sub-eye-box in each position of the image projector. The eye-box is the sum of the sub-eye-boxes, in particular the eye-box may be a sum of the sub-eye-boxes associated with each of the plurality of positions of the image projector. The eye-box may be referred to as an extended eye-box (as discussed in the first aspect).

The method may further comprise moving the image projector to a second position. The method may further comprise forming a virtual image viewable from a second sub-eye-box in a second position in the first dimension. In such cases, the extended eye-box may comprise at least the first and second sub-eye-box. The method may further comprise moving the projector to one of the plurality of positions in response to an input related to a position of a viewing system. The method may further comprise monitoring the position of the viewing system with an eye-tracker device. The input may be an output of the eye-tracker device. The method may further comprise moving the image projector to a position in which a virtual image is viewable from a sub-eye-box corresponding with the viewing system.

In a fourth aspect, there is provided an image projector. The image projector comprises an eye-box. The eye-box has a first dimension and a second dimension. The image projector further comprises a housing. The image projector further comprises a picture generating unit comprising a spatial light modulator. The spatial light modulator is arranged to display a hologram such that light incident on the spatial light modulator is spatially modulated in accordance with the hologram. The image projector further comprises an optical system arranged to relay spatially modulated light from the picture generating unit towards the eye-box of the image projector. The image projector further comprises a movement assembly arranged to move at least one component of the picture generating unit together with the optical system between a plurality of positions relative to the housing of the image projector. The image projector is arranged such that the spatially modulated light is relayed to a sub-eye-box having a position in the first dimension that is dependent on the position of optical system relative to the housing, wherein the eye-box is the sum of the sub-eye-boxes associated with each of the plurality of positions of the optical system.

Feature described in relation to the first aspect may apply to the method of the third aspect or the image projector of the fourth aspect, and vice versa.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

The following numbered items are also disclosed.

Item 1. A head-up display system comprising an eye-box having a first dimension and a second dimension and further comprising:

an image projector comprising a picture generating unit and an optical system, the picture generating unit comprising a spatial light modulator arranged to display a hologram such that light incident on the spatial light modulator is spatially modulated in accordance with the hologram, the optical system being arranged to relay spatially modulated light from the picture generating unit to an optical combiner; and a movement assembly arranged to move the image projector between a plurality of positions;

wherein the head-up display is arranged such that the spatially modulated light relayed to the optical combiner forms a virtual image viewable from a sub-eye-box having a position in the first dimension that is dependent on the position of the image projector; and wherein the eye-box is the sum of the sub-eye-boxes associated with each of the plurality of positions of the image projector.

Item 2. A head-up display as defined in item 1, wherein the movement assembly is arranged to move the image projector rectilinearly between the plurality of positions.

Item 3. A head-up display as defined in item 1 or 2, wherein the head-up display further comprises a hologram engine arranged to generate the computer-generated hologram of an image and the picture generating unit comprises a light receiving surface arranged such that a holographic reconstruction is formed or displayed on the light-receiving surface; and wherein the size or shape of the holographic reconstruction formed or displayed on a light-receiving surface is dependent on the position of the image projector.

Item 4. A head-up display as defined in any one of the preceding items, wherein the movement assembly is arranged such that there are four or more, optionally six or more, positions of the image projector.

Item 5. A head-up display as defined in any one of the preceding items, wherein the extent (e.g. size) of the eye-box in the first dimension is 100 millimetres or more.

Item 6. A head-up display as defined in any one of the preceding items, wherein the extent (e.g. size) of each sub-eye-box in the first dimension is 50 millimetres or less.

Item 7. A head-up display as defined in any one of the preceding items, wherein the movement assembly comprises a stepper motor.

Item 8. A head-up display as defined in any one of the preceding items, further comprising a controller configured to control the movement assembly to move the image projector to one of the plurality of positions based on an input related to the position of a viewing system.

Item 9. A head-up display as defined in item 8, further comprising an eye-tracker arranged to monitor the position of the viewing system, wherein the input is an output of the eye-tracker.

Item 10. A head-up display as defined in any one of the preceding items, wherein the picture generating unit further comprises a light source and a light receiving member such as a screen or diffuser.

Item 11. A display system comprising a head-up display system as defined in any one of the preceding items and an optical combiner.

Item 12. A display system as defined in item 11, wherein the optical combiner has a curved shape.

Item 13. A display system as defined in item 11 or 12, wherein the optical combiner is a window or windscreen of a vehicle.

Item 14. A display system as defined in any one of items 11 to 13, wherein the optical combiner substantially lies in a first plane and wherein the movement assembly is arranged to move the image projector linearly in a first direction that is angled relative to the first plane.

Item 15. A method of forming a virtual image viewable from an eye-box having a first dimension and a second dimension, the method comprising:

moving an image projector comprising a picture generating unit and an optical system to a first position of a plurality of positions of the image projector; wherein the picture generating unit comprises a spatial light modulator arranged to display a hologram such that light incident on the spatial light modulator is spatially modulated in accordance with the hologram, the optical system being arranged to relay spatially modulated light from the picture generating unit to an optical combiner;

forming a virtual image viewable from a first sub-eye-box in a first position in the first dimension;

wherein the image projector is arranged such that a virtual image is viewable from a sub-eye-box in each position of the image projector, the eye-box being the sum of the sub-eye-boxes.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration of Holographic Picture Generating Unit

Figure 1:
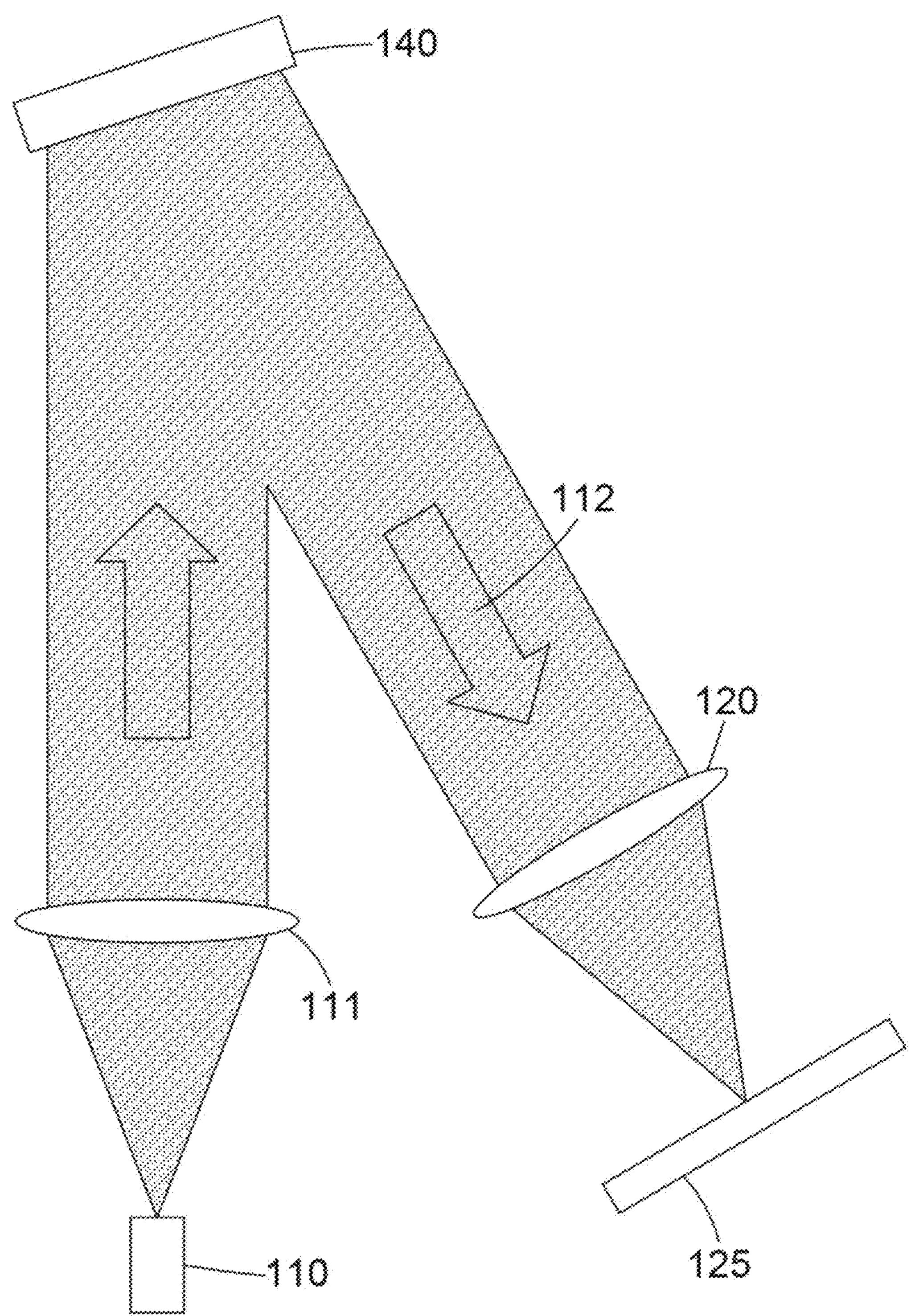
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
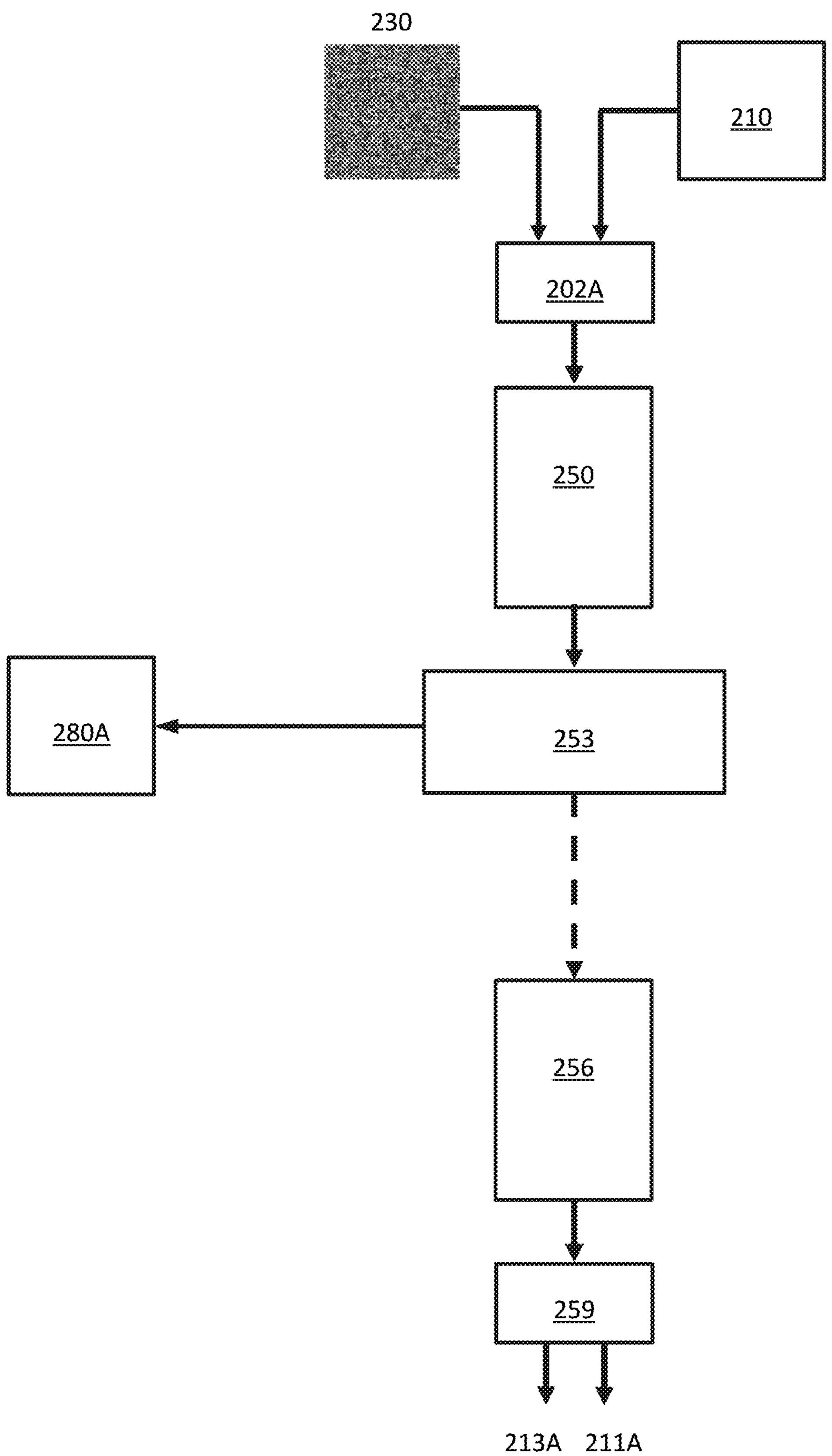
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantiles each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
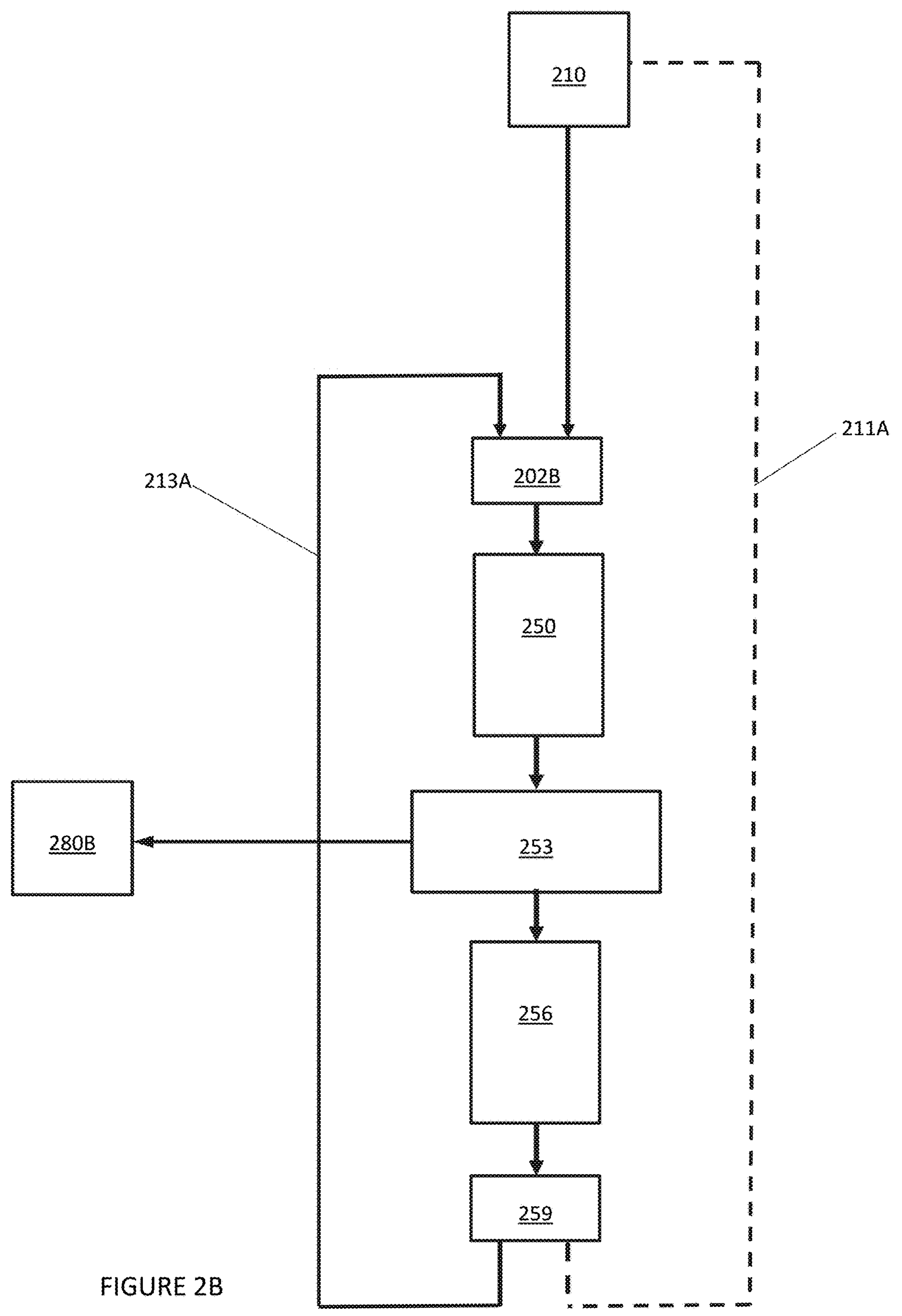
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
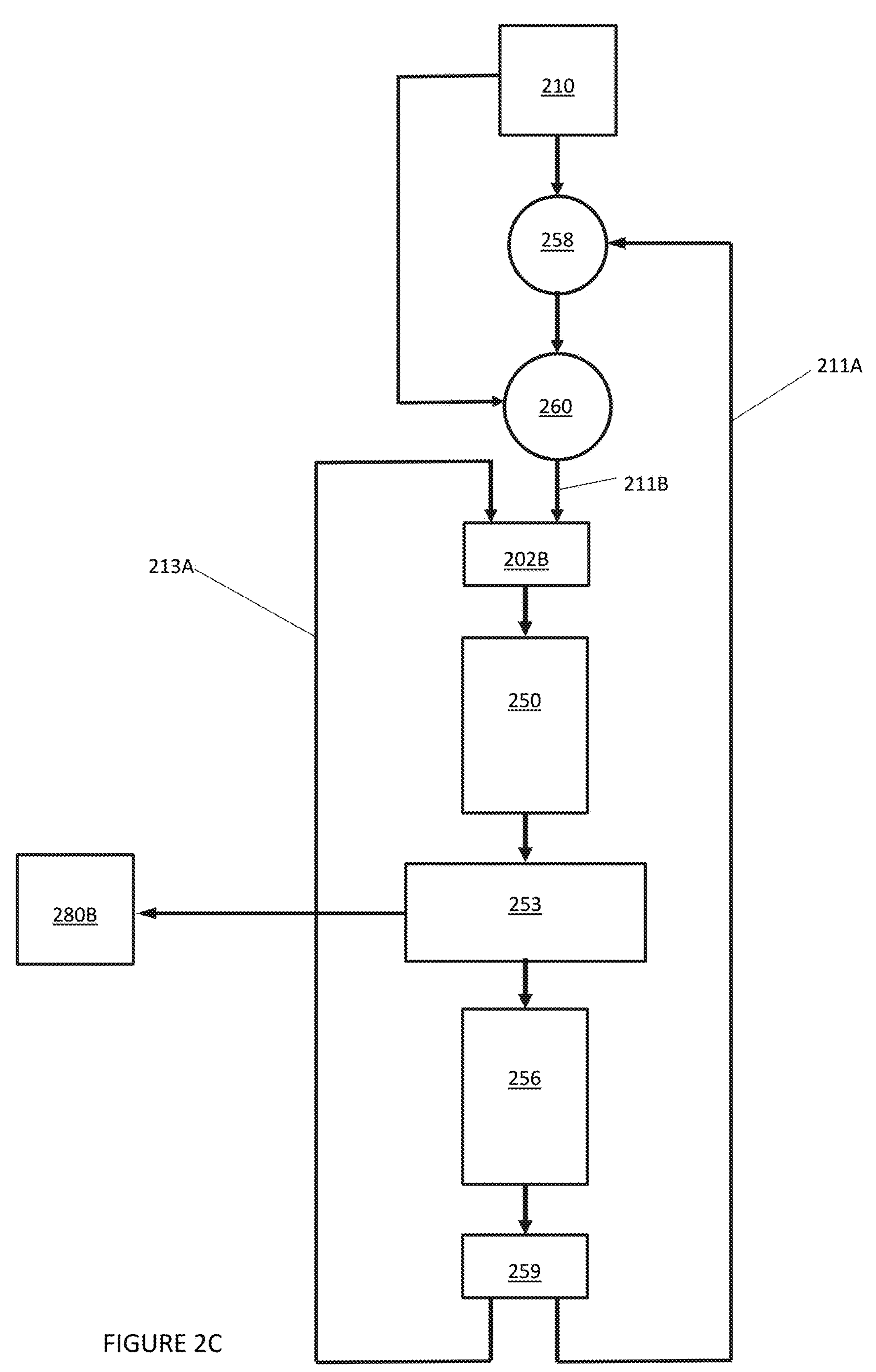
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(R_n[x,y]|-T[x,y])$$

where:

F' is the inverse Fourier transform;

F is the forward Fourier transform;

R[x, y] is the complex data set output by the third processing block 256;

T[x, y] is the input or target image;

∠ is the phase component;

ψ is the phase-only hologram 280B;

η is the new distribution of magnitude values 211B; and

α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
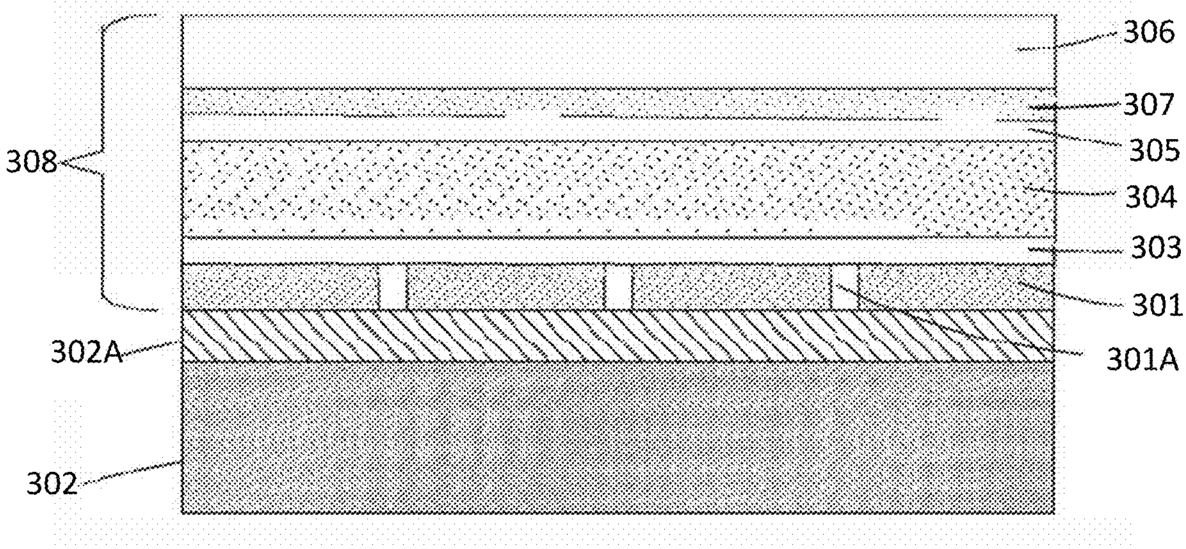
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

As described above, the principles of the present disclosure are applicable to non-holographic picture generating units as well as holographic picture generating units as described above.

Compact Head-Up Display

The picture generating unit described in relation to FIG. 1 is typically provided as part of a head-up display system (HUD-system). The HUD system further comprises an optical relay system arranged to relay light of a picture from a display area of a picture generating unit to an eye-box such that a virtual image of the picture is visible therefrom. As described herein, the eye-box comprises an area, optionally a volume, from which the virtual image can be fully perceived by a viewer. As the skilled person will appreciate, the virtual image becomes increasingly less completely visible from viewing positions further away from the eye-box.

Ray tracing techniques may be used to measure parameters, such as distortion and horizontal/vertical disparity, in order to objectively identify viewing positions where the virtual image is clear. Based on such measurements, the inventors have recognised that the optical relay system may be configured in order to define the eye-box area to satisfy design requirements, such as packing requirements.

Head-Up Display

The picture generating unit described in relation to FIG. 1 is typically provided as part of a head-up display system (HUD-system). The HUD system further comprises an optical relay system arranged to relay light of a picture from a display area of a picture generating unit to an eye-box such that a virtual image of the picture is visible therefrom. As described herein, the eye-box comprises an area, optionally a volume, from which the virtual image can be fully perceived by a viewer. As the skilled person will appreciate, the virtual image becomes increasingly less completely visible from viewing positions further away from the eye-box.

Ray tracing techniques may be used to measure parameters, such as distortion and horizontal/vertical disparity, in order to objectively identify viewing positions where the virtual image is clear. Based on such measurements, the inventors have recognised that the optical relay system may be configured in order to define the eye-box area to satisfy design requirements, such as packing requirements.

Figure 4:
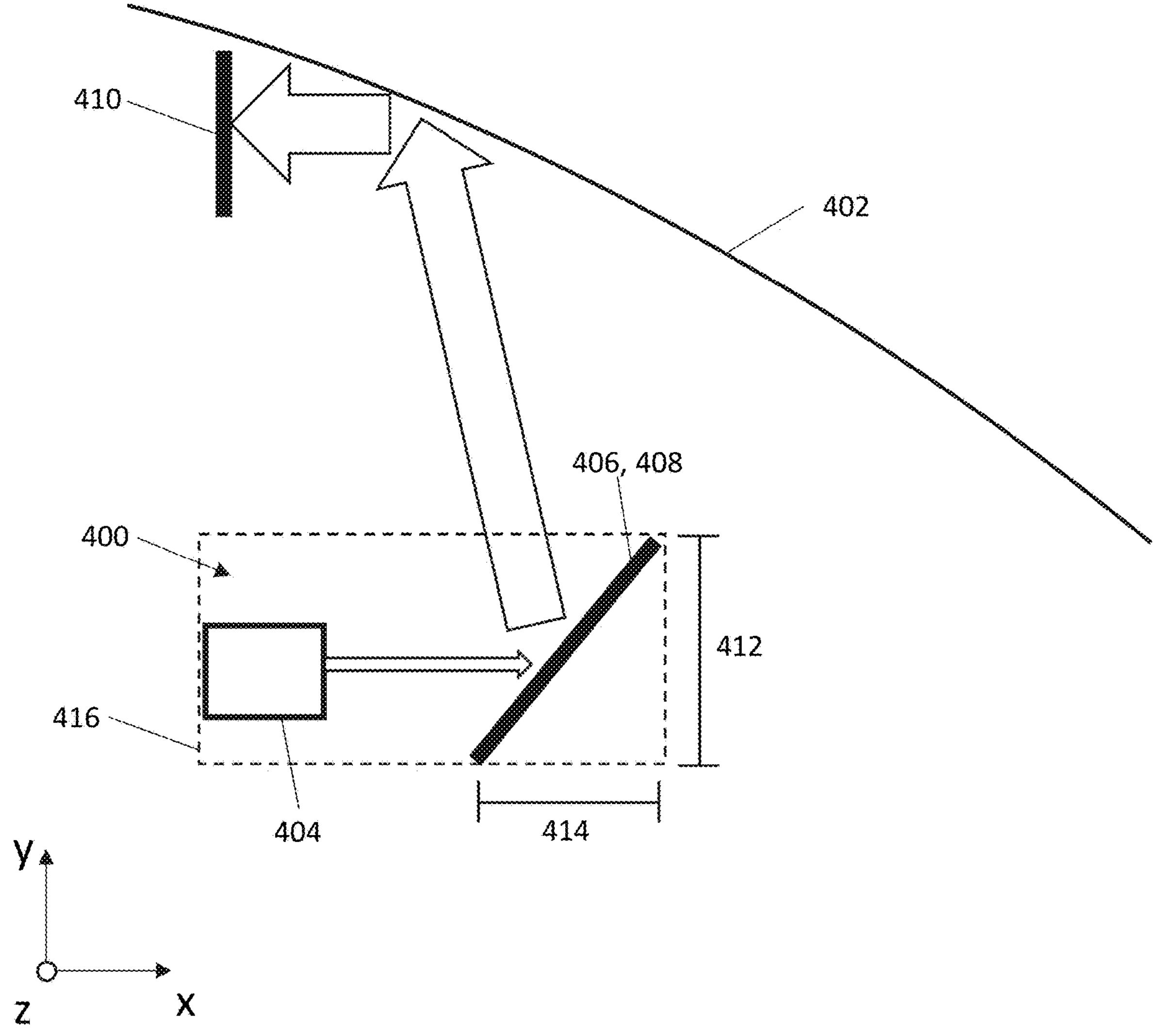
FIG. 4 shows a schematic cross-section of a vehicle comprising a conventional HUD-system.

FIG. 4 schematically shows a conventional configuration of a HUD-system 400 positioned within a vehicle comprising an optical combiner in the form of a windscreen 402. The HUD-system 400 comprises a picture generating unit (PGU) 404 and an optical relay system 406. The PGU 404 and optical relay system 406 are represented schematically in FIG. 4. However, the skilled person will be aware that each of these features may comprise a plurality of components. For example, the PGU 404 comprises the light source 110, SLM 140, collimating lens 111, Fourier transform lens 120 and screen 125 of FIG. 1. The optical relay system 406 comprises a large freeform mirror 408 configured to relay light from the PGU 404 to the optical combiner 402. The large freeform 408, and the optical path distance between the PGU 404 and the optical combiner 402, is arranged so that an image generated by the PGU 404 is magnified. Of course, in some embodiments, the optical relay system 406 may comprise additional optical components, such as additional mirrors, in order to relay light from the PGU 404 to the optical combiner 402. However, a single mirror is shown in FIG. 4 for simplicity.

The path of light in FIG. 4 is represented by arrows. Spatially modulated light is relayed from the PGU 402 to the optical combiner 404 via the optical relay system 406 to form a virtual image of the hologram reconstruction formed by the PGU 402. The virtual image is viewable from an eye-box 410. The eye-box 410 has a height extending in a first dimension which is parallel to the Y-axis shown in FIG. 4 (i.e. up and down). The eye-box 410 has a width extending in a second dimension which is parallel to the Z-axis shown in FIG. 4 (i.e. in and out of the page). In one example, the height of the eye-box 410 is 150 millimetres and the width of the eye-box 410 is 130 millimetres. The eye-box 410 is represented by the black rectangle in FIG. 4. However, the skilled person will appreciate that the eye-box 410 is not a physically object. As above, the eye-box 410 is the region in space in which a user can completely view the virtual image. It is generally desirable for a HUD system in a vehicle to provide an eye-box that is large enough to enable some movement of the eye/s to occur, whilst still enabling the user to completely see the image. So, large eye-boxes are desirable. To achieve this, conventionally, the optical relay system 406 comprises a very large freeform mirror 408 to achieve the necessary magnification required for a relatively large eye-box. This is disadvantageous because a large freeform mirror 408 results in volume occupied by the HUD system also being large. The extent of the large freeform mirror 408 in the y direction is represented by 412 in FIG. 4. The extent of the large freeform mirror 408 in the x direction is represented by 414 in FIG. 4. Typically, in the automotive industry, the volume of a component (such as the HUD system) is determined as the volume of a cuboid defined by the maximum extent of the component in each of the x, y and z directions. As shown in FIG. 4, the maximum extent of the HUD system 400 in the y direction is defined by the large freeform mirror 408 in the y direction. So, the overall volume of the HUD-system (represented by rectangle 416 in FIG. 4) is dependent on the size of the large freeform mirror 408. The large volume of conventional HUD systems having a large eye-box 410 is a problem because HUD systems are conventionally housed within the dashboard of the vehicle. Real-estate within the cabin space—particularly within the dashboard volume—is highly valuable in modern vehicles containing many complex electronic systems and head-up displays are quite expensive in terms of real-estate. The limited space for the optical components of the HUD places a limit on the maximum size of the eye-box.

Another problem with the optical relay system comprising a large freeform mirror 408 to increase the size of the eye-box is that, as with any optical component, the performance of the optical component declines with distance from the optical axis. In particular, aberrations increase with distance from the optical axis. The outer most parts of the at least one optical element of the projection engine therefore have the most detrimental effect on image quality. The overall image quality is therefore reduced if the eye-box is increased by increasing the size of at least one optical element of the projection engine.

Compact Head-Up Display

Figures 5, 6:
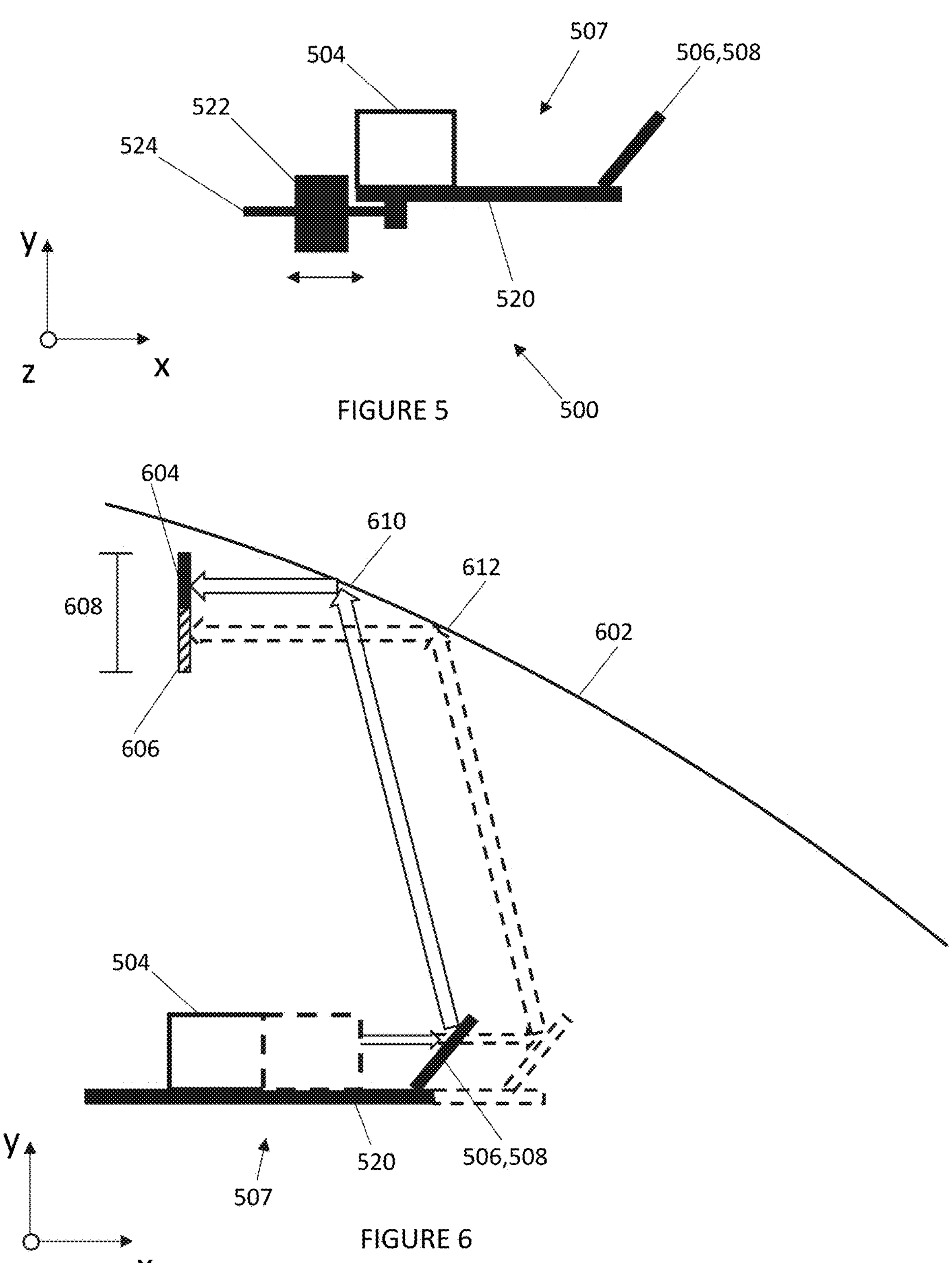
FIG. 5 shows a schematic cross-section of a HUD-system according to the invention.
FIG. 6 shows a schematic cross-section of a vehicle comprising the HUD-system of FIG. 5, an image projector of the HUD system being shown in a first position and a second position.

FIG. 5 is a schematic of a HUD system 500 for a vehicle according to the disclosure. The HUD system 500 comprises a PGU 504 which is identical to PGU 404 of FIG. 4. The HUD system 500 further comprises an optical relay system 506 comprising a mirror 508 such as a freeform mirror. The mirror 508 is much smaller than the mirror 408 of FIG. 4. This results in the HUD system 500 being much more compact than the HUD system 400 of FIG. 4 and with minimal detrimental effect on the image caused by aberrations. The HUD system 500 further comprises a frame 520 and a movement assembly comprising a stepper motor 522 and a threaded screw 524. The threaded screw 524 is rigidly coupled to the frame 520 at an end of the threaded screw 524. The movement assembly is arranged such that the stepper motor 522 and threaded screw 524 operate together as a linear actuator capable of moving the frame 520 in the x direction. In particular, rotational motion created by the stepper motor 522 is converted into linear (rectilinear) motion of frame 520 by the threaded screw 524. In this example, the PGU 504 and optical relay system 506 are both positioned on the frame 520 such that the movement assembly causes motion of the PGU 504 and the optical relay system 506 in the x direction. Thus, in this example, a separation between the PGU 504 and the optical relay system 506 remains constant in all positions of the frame. The combination of the frame 520, PGU 504 and optical relay system 506 may collectively be referred to as an image projector 507. In this example, the image projector 507 is moved collectively, as a whole, such that all components of the image projector 507 are moved by the movement assembly.

In some embodiments, the movement assembly comprises additional components to translate the motion of the stepper motor to linear motion of the image projector 507 and the stepper motor 522 and threaded screw 524 may be positioned differently to that show in FIG. 5. In particular, the movement assembly may be arranged to take up as little volume as possible, or to occupy a volume in the dashboard of a vehicle which has lower cost. In some embodiments, the movement assembly comprises a rack and pinion arrangement. In some embodiments, the rack is coupled to the frame 520 and the pinion is driven by the stepper motor such that rotational motion of the stepper motor 522 can be converted into linear motion of the image projector 507.

The movement assembly is arranged to move the image projector 507 between a plurality of discrete or predetermined positions. When the HUD system 500 is used in a vehicle comprising an optical combiner (windscreen) a virtual image may be visible from a sub-eye box in each position of the image projector such that there are as many sub-eye boxes are there discrete or predetermined positions of the image projector. Because of the complex curved shape of the windscreen and the geometry of the HUD-system with respect to the windscreen, each sub-eye box has a different position in the Y direction. This is explained in more detail in FIG. 6.

FIG. 6 shows a cross-sectional schematic view of the HUD system 500 of FIG. 5 positioned in the dashboard of a vehicle. The only feature of the vehicle (other than the HUD system 500) shown in FIG. 6 is the windscreen (optical combiner) 602. The movement assembly of the HUD system 500 has been omitted in FIG. 6 for simplicity, however it should be clear that the HUD system 500 of FIG. 6 comprises a movement assembly as described above.

FIG. 6 shows the image projector 507 of the HUD system 500 in two discrete or predetermined positions. A first position of the HUD system 500 is represented by unbroken lines in FIG. 6. A second position of the HUD system 500 is represented by broken lines in FIG. 6. The HUD system 500 has been translated linearly in a direction parallel to the x-direction to the right in the second position relative to the first position. In the first position of the image projector 507, light is relayed to a first portion 610 of the optical combiner 602 such that a virtual image is visible from a first eye-box. This first eye-box is referred to as first sub-eye box 604. As discussed above, the mirror 508 is much smaller than the mirror 408 of FIG. 4 and this results in the first sub-eye box 604 being smaller that the eye-box 410 shown in FIG. 4. In particular, the height of the mirror 508 is smaller in the y direction than the mirror 408 and so the height of first sub-eye box 604 in the y direction is smaller than the height of eye-box 410. In most embodiments however, the width of the first sub-eye-box 604 is the same eye-box 410 of FIG. 4. In the second position of the image projector 507, light is relayed to a second portion 612 of the optical combiner 602 such that a virtual image is visible from a second eye-box, referred to herein as the second sub-eye box 606. The second sub-eye box 606 has a size that is substantially the same as the first sub-eye box 604. The first and second sub-eye boxes 604, 606 together define a continuous eye-box having a size which corresponds to the eye-box 410 of FIG. 4. In other words, an effective eye-box 608 is defined as the sum of the first and second sub-eye boxes 604, 606. Of course, a virtual image is only ever completely viewable from one of the sub-eye boxes 604, 606 at any one time (depending on the current position of the image projector). However, the image projector 507 may be moved, for example, in response to a change in viewing position of user in order to ensure that the user's eyes fall within a sub-eye-box. Thus, the same range of movement of the user's eyes while still being able to see the virtual image completely as in the embodiment of FIG. 4 may be maintained despite the smaller optical components and smaller sub-eye-box size of the embodiment of FIG. 5.

The embodiment of FIG. 6 has been described as having an image projector 507 having only a first position and a second position. In some embodiments, the movement assembly is arranged to move the image projector 507 to more than two discrete or predetermined positions. The more discrete or predetermined positions, the greater the number of sub-eye-boxes. The greater the number of sub-eye-boxes, the smaller each sub-eye-box can be while still providing an effective eye-box having a size corresponding to the size of the eye-box 410 of FIG. 4. Thus, the greater the number of sub-eye-boxes, the smaller the volume of the HUD-system. However, smaller sub-eye-boxes (for example sub-eye-boxes with a small height) will increase the amount of movement requirement of the image projector in order to maintain a user's eyes within a sub-eye-box. This may create a jarring or jumpy experience. The inventors have found that an image projector having six predetermined or discrete positions (and so six possible sub-eye-boxes) strikes a good balance of providing a compact HUD system while maintaining a good user experience.

Figure 7:
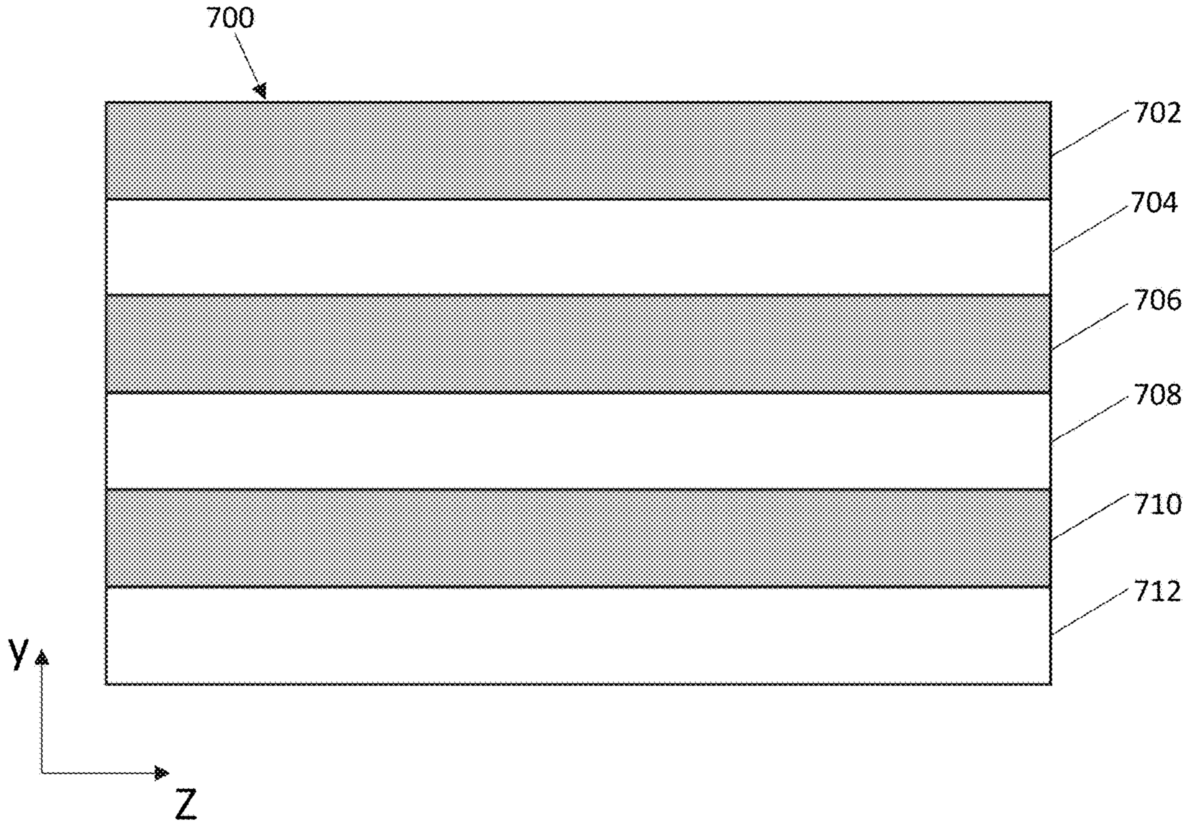
FIG. 7 shows an extended eye-box.

FIG. 7 represents an effective or extended eye-box 700 defined by a sum of six sub-eye-boxes corresponding to an image projector having six discrete or predetermined positions. The extended eye-box 700 is continuous such that a user may position their eyes at any position within the extended eye-box 700 to completely view the virtual image (subject to any required positional change of the image projector by the movement assembly). Each of the six sub-eye-boxes are stacked on top of one another and substantially aligned with one another. In some embodiments, the sub-eye-boxes overlap with one another but in the embodiment shown in FIG. 7 the eye-boxes do not overlap. The six sub-eye-boxes are stacked as follows, from top to bottom: first sub-eye-box 702, second sub-eye-box 704, third sub-eye-box 706, fourth sub-eye-box 708, fifth sub-eye-box 710 and sixth sub-eye-box 712. Each of the sub-eye-boxes corresponds to a first to sixth position of the image projector along the x-axis with the first sub-eye-box being furthest to the left and the sixth sub-eye-box being furthest to the right along the x-axis (when looking at FIG. 6). The distance followed by light from the PGU 602 is longest in the first position and shortest in the sixth position. The shading of alternate sub-eye-boxes in FIG. 7 is merely to distinguish between adjacent eye-boxes. In this embodiment, each sub-eye-box has a height in the y-direction of 25 millimetres and a width of 130 millimetres. Thus, the extended eye-box (equivalent to the sum of six stacked sub-eye-boxes) has a height of 150 millimetres and a width of 130 millimetres. This is the same as the eye-box 410 of FIG. 4.

Figure 8:
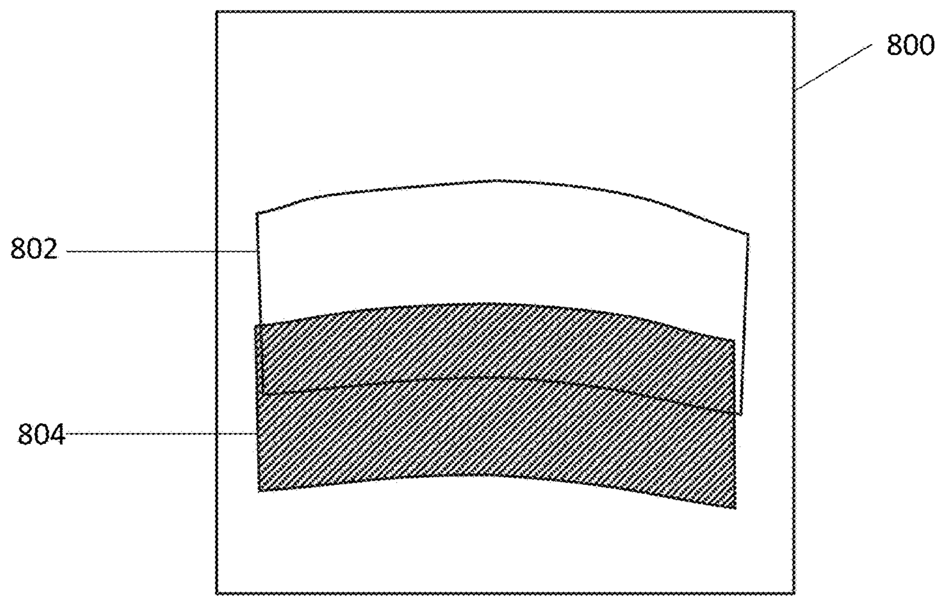
FIG. 8 shows a hologram or picture content displayed on a spatial light modulator.

The image projector 507 is moved linearly (rectilinearly) between the plurality of predetermined or discrete positions. This motion is advantageously simple and allows for a simple movement assembly (e.g. comprising a stepper motor as described above) to move the frame 520 as a whole. As described above, there is significant prejudice in the technical field against moving an image projector in this way. As shown in FIG. 6, light is relayed to different portions of the windscreen in different positions of the image projector. The complex shape of the windscreen and the geometry of the image projector with respect to the windscreen means that the skilled person would expect the image projector and the windscreen to cause the virtual image to appear distorted in at least some of the sub-eye-boxes and the look-down angle may alter from sub-eye-box to sub-eye-box. However, the inventors have deduced that these problems can be compensated for in the hologram that is displayed on the SLM. In particular, the hologram (or other picture content) displayed on the SLM can be altered depending on the current position of the projector such that the position and size of the hologram reconstruction formed on the screen 125 is also altered depending on the current position of the projector. This is represented in FIG. 8 which represents a display surface 800 of the diffuser or screen 125 shown in FIG. 1. FIG. 8 shows a first hologram reconstruction 802 associated with the first position of the image projector (shown in FIG. 6) and a second hologram reconstruction 804 associated with the second position of the image projector (shown in FIG. 6). In reality, the display surface 800 would display the first hologram reconstruction 802 or the second hologram reconstruction 804, not both holograms superimposed on one another. However, in FIG. 8 the first and second holograms reconstructions 802,804 are shown superimposed to make it clear that the size and position of the first hologram reconstruction is different relative to the second hologram reconstruction. This change in size and position compensates for any possible distortion or change in look-down angle when the image projector is moved to different positions. Advantageously, manipulating the position and size of the hologram reconstructions by changing the hologram displayed on the SLM means that the image distortion and look-down angle can be compensated for without reducing light efficiency because a hologram redirects all the received light at the SLM such that all of the light received at the SLM is used in the reconstruction of the hologram. The display surface of the SLM can be fully utilized in all positions of the image projector.

In some embodiments, the HUD system comprises an eye-tracker. The eye-tracker is arranged to monitor/detect the position of one or both of a user's eyes. The HUD system further comprises a controller configured to control the movement assembly to move the image projector to a position in which the sub-eye-box aligns with the detected position of the eye(s). In this way, the head-up display may be said to track the viewing system and move the image projector accordingly.

Figure 9:
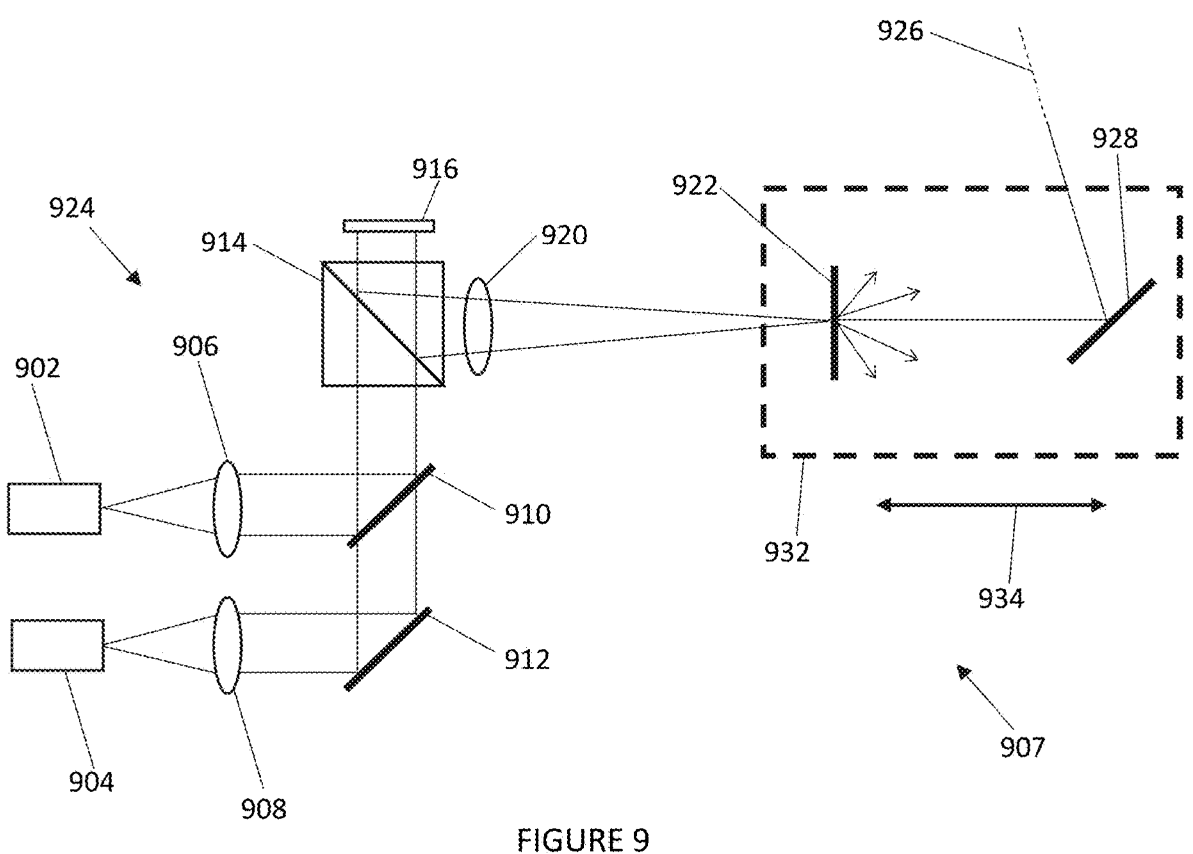
FIG. 9 shows a schematic cross-section of a second example of a HUD-system according to the invention.

A second example of a head-up display comprising an image projector 907 according to the present disclosure is shown in FIG. 9. FIG. 9 shows a cross-sectional schematic view of the image projector 907. More components of the image projector 907 are shown in FIG. 9 than are shown of the image projector 507 in FIG. 5. FIG. 9 shows a multi-channel image projector 907 comprising a first light source 902 (which, in this example, is a first laser) and a second light source 904 (which, in this example, is a second laser). In this example, the first light source 902 outputs light of a first wavelength and the second light source 904 outputs light of a second wavelength which is different to the first wavelength. Downstream of each light source is, respectively, a first collimation lens 906 and a second collimation lens 908. The first and second collimation lenses 906, 908 are arranged to collimate the light emitted by the first and second light sources 902, 904. The image projector 907 further comprises a first display device 910 (which, in this example is a first liquid crystal on silicon spatial light modulator) and a second display device 912 (which, in this examples is a second liquid crystal on silicone spatial light modulator). The first display device 910 is arranged to display a first hologram. The second display device 912 is arranged to display a second hologram. The image projector 907 is arranged such that the first display device 910 is illuminated by light emitted by the first light source 902 such that the light incident thereon is spatially modulated in accordance with the first hologram and the second display device 912 is illuminated by light emitted by the second light source 904 such that the light incident thereon is spatially modulated in accordance with the second hologram. The image projector 907 further comprises a beam splitter 914 which is arranged to receive and combine the light that is spatially modulated in accordance with the first and second holograms. A first portion of the light received by the beam splitter 914 is transmitted and absorbed by block 916. A second portion of the light received by the beam splitter 914 is reflected. The reflected second portion is received by a lens 920 which is arranged to converge the reflected portion. The image projector 907 is arranged such that the spatially modulated light forms a holographic reconstruction at a replay plane. In the example shown in FIG. 9, the replay plane is coincident with a light receiving surface 922 of the image projector 907. The light receiving surface 922 is a diffuse surface. An image is formed on the light receiving surface. The image is an image that was encoded in the first and second holograms displayed on the first and second display devices 910, 912. Because the image projector 907 comprises two light sources 902,904 and two separate channels (which are mixed at the beam splitter 914), the image formed on the light receiving surface is a multi-colour holographic reconstruction. The light receiving surface 922 may be referred to as a screen or diffuser (similar to the diffusers described above). Because the light receiving surface 922 is coincident with the replay plane, the formed image is in focus.

The first and second light sources 902, 904; the first and second collimation lenses 906, 908; the first and second display devices 910, 912; the beam splitter 914; the block 916; the lens 920 and the light receiving surface 922 together form a picture generating unit 924 or PGU 924. Image projector 907 further comprises an optical relay system 928 comprising a mirror such as a freeform mirror. The optical relay system 928 is arranged receive image light from the light receiving surface 922. The optical relay system 928 is arranged to relay the image light towards an eye-box of the system, for example towards an optical combiner such as optical combiner 602. Image light being relayed from the optical combiner is represented by the dashed line 926 in FIG. 9. So, like image projector 507, image projector 907 comprises a PGU 924 and an optical relay system 906.

The head-up display comprising image projector 907 of FIG. 9 differs from the arrangement shown in FIG. 5 in that, in FIG. 9, the movement assembly is arranged to only move the optical components downstream of lens 920 (i.e. the light receiving surface 922 and the optical relay system 928) rather than the image projector as a whole. The optical components upstream of the light receiving surface 922 are not moved by the movement assembly. In some examples, the PGU of FIG. 9 further comprises a housing. It may be said that the components upstream of the light receiving surface 922 are fixed with respect to the housing. It may be said that that the movement assembly is arranged to move the light receiving surface 922 and the optical relay 928 with respect to the housing. In other words, the movement assembly is arranged to move the optical relay system 928 and at least one component of the PGU 924 together (the at least one component of the PGU 924 being the light receiving surface 922).

The components of FIG. 9 that are moved by the movement assembly are contained in the rectangle 932 formed by the dashed line. The movement of the moved components is represented by the double-headed arrow 934 in FIG. 9. The movement assembly may be arranged to move the relevant components between a plurality of different positions in in the direction represented by the double-headed arrow 934. The movement assembly of the HUD of FIG. 9 is not illustrated. However, it should be understood that any movement assembly suitable for moving the components contained in rectangle 932 between a plurality of different positions may be used. For example, a movement assembly similar to that described in relation to FIG. 5 may be employed. The only difference may be that only the light receiving surface 922 of the PGU 924 and the optical relay system 928 may be fixed to the frame, rather than the entire PGU and optical relay system being fixed to the frame (as in FIG. 5). The skilled reader will understand that the movement of the components in the rectangle 932 has the same effect as the movement of the entire image projector 507 (as in FIG. 5). In particular, the movement in both arrangements result in movement of the optical relay system 928 with respect to the optical combiner and so will change the position of the relayed light incident on the optical combiner (e.g. optical combiner 602) which in turn will result in a change in the position of an instantaneous sub-eye box (as described in relation to FIG. 6). Thus, an extended eye-box can be formed as a superposition of each of the sub-eye boxes by movement caused by the movement assembly in both examples.

All of the features described in relation to PGU 924 may also be present in PGU 504 of FIG. 5. Furthermore, it should be clear that other optical arrangements are possible, for example, having different numbers of colour channels.

Figure 10:
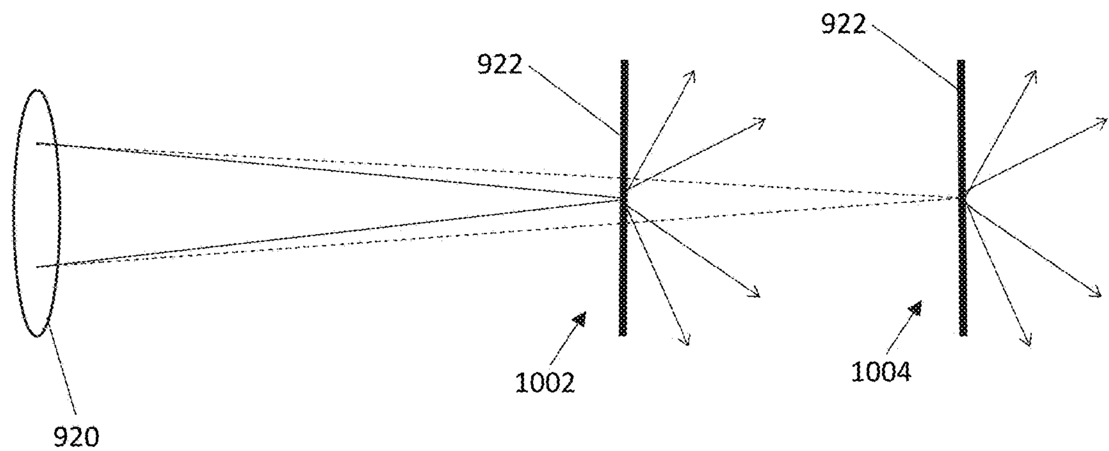
FIG. 10 shows a light receiving surface of the HUD-system of FIG. 9 in a first position and a second position with respect to a physical lens, wherein a different software lens is used in each of the first and second positions.

The inventors have recognised that, as the movement assembly moves the components contained in the rectangle 932, a separation between the lens 920 (which is fixed) and the light receiving surface 922 (which is moved with respect to the lens 920) will also change. This is shown in FIG. 10. FIG. 10 is a schematic cross-sectional view of the lens 920 and the light receiving surface 922 in two positions with respect to the lens 920. A first position of the light receiving surface 922 is shown by 1002 in FIG. 10 with the light beam from the lens 920 to the light receiving surface 922 in the first position being represented by unbroken lines. A second position of the light receiving surface 922 is shown by 1004 in FIG. 10 with the light beam from the lens 920 to the light receiving surface 922 in the second position being represented by broken lines. A separation between the light receiving surface 922 and the lens 920 is greater in the second position 1004 of the light receiving surface 922 than in the first position 1002 of the light receiving surface 922.

As described above, for a high quality image projection, it may be important that the holographically reconstructed image formed by the PGU 924 is formed on a replay plane that is coincident with the light receiving surface 922. The skilled person will appreciate that, if nothing else is changed, but the separation between the light receiving surface 922 and the lens 920 is changed, then the replay plane will no longer be coincident on the (moved) light receiving surface 922. To compensate for this, the inventors have recognised that a software lens can be used. In particular, a diffractive pattern having an optical power can be displayed on the (first and second) display device. The diffractive pattern having an optical power may cause the translation of the replay plane along the optical axis (to be closer or further away from lens 920). This will depend on the whether diffractive pattern has a converging or diverging effect. The skilled person will be familiar with diffractive patterns that perform as a physical lens, having an optical power. By selecting a software lens having an appropriate optical power based on the current (relative) position of the light receiving surface 922 and the lens 920, it can be ensured that the replay plane remains substantially coincident with the light receiving surface 922 in each position of the light receiving surface 922. For example, the image projector 907 may comprise a controller arranged to select an appropriate diffractive pattern from a memory based on the current position of the light receiving surface 922/movement assembly. The controller may be arranged to drive the or each display device to display an appropriate diffractive pattern.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the detector is a photodetector such as a photodiode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focussed at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A head-up display system comprising an eye-box having a first dimension and a second dimension and further comprising:

- an image projector comprising a picture generating unit and an optical system, the picture generating unit comprising a spatial light modulator arranged to display a hologram such that light incident on the spatial light modulator is spatially modulated in accordance with the hologram, the optical system being arranged to relay spatially modulated light from the picture generating unit to an optical combiner; and
- a movement assembly arranged to move at least a portion of the image projector rectilinearly between a plurality of positions such that at least one component of the picture generating unit is moved together with the optical system when the at least portion of the image projector is moved between the plurality of positions;
- wherein the spatial light modulator is fixed such that the movement assembly is arranged to not move the spatial light modulator when the at least portion of the image projector is moved between the plurality of positions;
- wherein the head-up display is arranged such that the spatially modulated light relayed to the optical combiner forms a virtual image viewable from a sub-eye-box having a position in the first dimension that is dependent on the position of the at least the portion of the image projector; and
- wherein the eye-box is a sum of the sub-eye-boxes associated with each of the plurality of positions of the at least the portion of the image projector.

2. A head-up display system as claimed in claim 1, wherein the picture generating unit comprises a light receiving surface arranged such that a holographic reconstruction is formed or displayed on the light receiving surface.

3. A head-up display system as claimed in claim 2, wherein the at least one component of the picture generating unit that is moved by the movement assembly is the light receiving surface.

4. A head-up display system as claimed in claim 3, wherein the spatial light modulator of the picture generating unit is fixed such that the movement assembly is arranged to move the light receiving surface relative to the spatial light modulator when the portion of the image projector is moved between the plurality of positions.

5. A head-up display system as claimed in claim 4, wherein the system further comprises a controller arranged to drive the spatial light modulator to display a diffractive pattern having an optical power, the diffractive pattern being arranged such that the holographic reconstruction is formed at a replay plane the is substantially coincident with the light receiving surface.

6. A head-up display system as claimed in claim 5, wherein the controller is arranged to change the diffractive pattern depending on a separation between spatial light modulator and the light receiving surface.

7. A head-up display system as claimed in claim 1, wherein the optical system comprises a mirror arranged to relay the spatially modulated light of the picture generating unit to the optical combiner.

8. A head-up display as claimed in claim 1, wherein the head-up display further comprises a hologram engine arranged to generate the computer-generated hologram of an image and the picture generating unit comprises a light receiving surface arranged such that a holographic reconstruction is formed or displayed on the light-receiving surface; and wherein the size or shape of the holographic reconstruction formed or displayed on a light-receiving surface is dependent on the position of the image projector.

9. A head-up display as claimed in claim 1, wherein the movement assembly is arranged such that there are four or more positions of the image projector.

10. A head-up display as claimed in claim 1, wherein an extent of the eye-box in the first dimension is 100 millimetres or more.

11. A head-up display as claimed in claim 1, wherein an extent of each sub-eye-box in the first dimension is 50 millimetres or less.

12. A head-up display as claimed in claim 1, wherein the movement assembly comprises a stepper motor.

13. A head-up display as claimed in claim 1, further comprising a controller configured to control the movement assembly to move the image projector to one of the plurality of positions based on an input related to the position of a viewing system.

14. A head-up display as claimed in claim 13, further comprising an eye-tracker arranged to monitor the position of the viewing system, wherein the input is an output of the eye-tracker.

15. A head-up display as claimed in claim 1, wherein the picture generating unit further comprises a light source and a light receiving member.

16. A display system comprising a head-up display system as claimed in claim 1 and an optical combiner.

17. A display system as claimed in claim 16, wherein the optical combiner has a curved shape.

18. A display system as claimed in claim 16, wherein the optical combiner is a window or windscreen of a vehicle.

19. A display system as claimed in claim 16, wherein the optical combiner substantially lies in a first plane and wherein the movement assembly is arranged to move the image projector linearly in a first direction that is angled relative to the first plane.

20. A method of forming a virtual image viewable from an eye-box having a first dimension and a second dimension, the method comprising:

- moving at least a portion of an image projector comprising a picture generating unit and an optical system to a first position of a plurality of positions of the at least portion of image projector such that at least one component of the picture generating unit is moved together with the optical system, wherein the picture generating unit comprises a spatial light modulator arranged to display a hologram such that light incident on the spatial light modulator is spatially modulated in accordance with the hologram, the optical system being arranged to relay spatially modulated light from the picture generating unit to an optical combiner; and forming a virtual image viewable from a first sub-eye-box in a first position in the first dimension;

wherein the spatial light modulator is fixed such that it is not moved when the at least portion of the image projector is moved between the plurality of positions; and wherein the at least the portion of the image projector is arranged such that a virtual image is viewable from a sub-eye-box in each position of the image projector, the eye-box being a sum of the sub-eye-boxes.

21. An image projector comprising an eye-box having a first dimension and a second dimension and further comprising:

a housing;

a picture generating unit comprising a spatial light modulator arranged to display a hologram such that light incident on the spatial light modulator is spatially modulated in accordance with the hologram;

an optical system arranged to relay spatially modulated light from the picture generating unit towards the eye-box of the image projector; and a movement assembly arranged to move at least one component of the picture generating unit together with the optical system between a plurality of positions relative to the housing of the image projector;

wherein the spatial light modulator is fixed such that the movement assembly is arranged to not move the spatial light modulator when the at least portion of the image projector is moved between the plurality of positions; and wherein the image projector is arranged such that the spatially modulated light is relayed to a sub-eye-box having a position in the first dimension that is dependent on the position of optical system relative to the housing, wherein the eye-box is a sum of the sub-eye-boxes associated with each of the plurality of positions of the optical system.

* * * * *